United States Patent
Hei et al.

(10) Patent No.: US 11,821,644 B2
(45) Date of Patent: *Nov. 21, 2023

(54) CONTROL TERMINAL, CONTROL METHOD AND DEVICE FOR MULTI-SPLIT AIR CONDITIONER, AND STORAGE MEDIUM

(71) Applicants: GD MIDEA AIR-CONDITIONING EQUIPMENT CO., LTD., Foshan (CN); MIDEA GROUP CO., LTD., Foshan (CN)

(72) Inventors: Jiwei Hei, Foshan (CN); Qifeng Fan, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 288 days.

This patent is subject to a terminal disclaimer.

(21) Appl. No.: 17/284,914

(22) PCT Filed: Nov. 29, 2018

(86) PCT No.: PCT/CN2018/118159
§ 371 (c)(1),
(2) Date: Apr. 13, 2021

(87) PCT Pub. No.: WO2020/077753
PCT Pub. Date: Apr. 23, 2020

(65) Prior Publication Data
US 2021/0381714 A1    Dec. 9, 2021

(30) Foreign Application Priority Data
Oct. 15, 2018   (CN) .......................... 201811201686.5

(51) Int. Cl.
*A47C 27/08* (2006.01)
*F24F 11/67* (2018.01)
(Continued)

(52) U.S. Cl.
CPC ............ *F24F 11/67* (2018.01); *F24F 1/0003* (2013.01); *F24F 11/58* (2018.01); *F24F 11/77* (2018.01); *F24F 11/84* (2018.01); *F24F 2110/10* (2018.01)

(58) Field of Classification Search
CPC .. F24F 11/67; F24F 11/77; F24F 11/84; F24F 11/58; F24F 2110/10
(Continued)

(56) References Cited

U.S. PATENT DOCUMENTS

2006/0123808 A1* 6/2006 Kim ......................... F24F 11/30
62/200
2010/0241287 A1* 9/2010 Nishino ................... F24F 11/30
62/160
(Continued)

FOREIGN PATENT DOCUMENTS

CN    1170855 A    1/1998
CN    1987239 A    6/2007
(Continued)

OTHER PUBLICATIONS

World Intellectual Property Organization (WIPO) International Search Report and Written Opinion for PCT/CN2018/118159 with translation dated Jul. 9, 2019 14 Pages.
(Continued)

*Primary Examiner* — Md Azad
(74) *Attorney, Agent, or Firm* — ANOVA LAW GROUP PLLC

(57) ABSTRACT

A control method includes acquiring indoor temperatures of a plurality of rooms each having one of a plurality of indoor
(Continued)

units of a multi-split air conditioner, identifying a target indoor unit corresponding to a target room in response to the target room satisfying an overheating condition or a super-cooling condition, controlling other one or more indoor units of the multi-split air conditioner except for the target indoor unit to be shut down, and switching an operation mode of the target indoor unit.

20 Claims, 4 Drawing Sheets

(51) Int. Cl.
$$\begin{array}{ll} F24F\ 11/77 & (2018.01) \\ F24F\ 11/84 & (2018.01) \\ F24F\ 11/58 & (2018.01) \\ F24F\ 1/0003 & (2019.01) \\ F24F\ 110/10 & (2018.01) \end{array}$$

(58) Field of Classification Search
USPC .......................................................... 700/276
See application file for complete search history.

(56) References Cited

U.S. PATENT DOCUMENTS

| | | | | |
|---|---|---|---|---|
| 2011/0190945 A1* | 8/2011 | Yoshii | ...................... | F24F 11/30 |
| | | | | 700/277 |
| 2011/0190954 A1* | 8/2011 | Nishino | .................. | F24F 11/46 |
| | | | | 700/291 |
| 2011/0232311 A1* | 9/2011 | Korenaga | ................ | F24F 11/83 |
| | | | | 62/222 |
| 2012/0022703 A1* | 1/2012 | Yeo | .......................... | F24F 11/63 |
| | | | | 700/277 |
| 2017/0219238 A1* | 8/2017 | Kibo | ....................... | F24F 11/84 |
| 2020/0284461 A1* | 9/2020 | Jiao | .......................... | F24F 11/00 |

FOREIGN PATENT DOCUMENTS

| | | | |
|---|---|---|---|
| CN | 101464026 | A | 6/2009 |
| CN | 103486691 | A | 1/2014 |
| CN | 104006445 | A | 8/2014 |
| CN | 104214893 | A | 12/2014 |
| CN | 105091204 | A | 11/2015 |
| CN | 105928059 | A | 9/2016 |
| CN | 107676938 | A | 2/2018 |
| CN | 108050657 | A | 5/2018 |
| CN | 108644968 | A | 10/2018 |
| JP | 2007139265 | A | 6/2007 |
| JP | 2009204174 | A | 9/2009 |
| JP | 2015209996 | A | 11/2015 |
| JP | 2016114280 | A | 6/2016 |
| KR | 0161217 | B1 | 1/1999 |
| KR | 20080012516 | A | 2/2008 |
| WO | WO-2018167961 A1 * | | 9/2018 ................ F25B 1/00 |

OTHER PUBLICATIONS

The State Intellectual Property Office of PRC (SIPO) The First Office Action For CN Application No. 201811201686.5 dated Jul. 17, 2019 26 Pages (Translation Included ).
The State Intellectual Property Office of PRC (SIPO) The Second Office Action For CN Application No. 201811201686.5 dated Dec. 13, 2019 22 Pages (Translation Included ).
The European Patent Office (EPO) Extended Search Report for EP Application No. 18937451.5 dated Nov. 25, 2021 11 Pages.
The European Patent Office (EPO) the Office Action for EP Application No. 18937451.5 dated Mar. 22, 2023 22 Pages.

* cited by examiner

CONTROL TERMINAL, CONTROL METHOD AND DEVICE FOR MULTI-SPLIT AIR CONDITIONER, AND STORAGE MEDIUM

CROSS-REFERENCE TO RELATED APPLICATIONS

This application is a National Stage Entry under 35 U.S.C. § 371 of International Application No. PCT/CN2018/118159, filed on Nov. 29, 2018, which claims priority to Chinese patent application No. 201811201686.5, filed on Oct. 15, 2018 and entitled "Control Terminal, Control Method and Device for Multi-split Air Conditioner and Storage Medium," the entire contents of both of which are incorporated herein by reference.

TECHNICAL FIELD

The present application relates to the technical field of air conditioning, in particular to a control terminal, a multi-split air conditioner, a control method and a control device therefor, and a storage medium.

BACKGROUND

A multi-split air conditioner has an outdoor unit and a plurality of indoor units.

In the related art, each indoor unit of the multi-split air conditioner can be controlled by a cloud server. When the cloud server controls the multi-split air conditioner, it controls each indoor unit to refrigerate or heat at the same time. The cloud server does not detect the temperature of each room where an indoor unit is located in real time, and hence the indoor temperature of a room having a certain indoor unit is set to be too low or too high, causing the user to stay in a low temperature or high temperature environment for a long time, thus threatening the health of the user.

SUMMARY

The main purpose of the present application is to provide a control terminal, a multi-split air conditioner, a control method and a control device therefor, and a storage medium, which aims to solve the problem that the heating or cooling of the multi-split air conditioner threatens health of users.

In order to achieve the above purpose, the present application provides a control method for a multi-split air conditioner, where the control method for the multi-split air conditioner includes following operations:

acquiring an indoor temperature of each room where an indoor unit in a group corresponding to the multi-split air conditioner is located;
acquiring a target indoor unit corresponding to a first target room satisfying an overheating condition or a supercooling condition in response to that there exists a room whose indoor temperature satisfies the overheating condition or the supercooling condition;
controlling other indoor units except the target indoor unit in the multi-split air conditioner to be shut down;
switching an operation mode of the target indoor unit.

In an embodiment, the overheating condition includes that in a heating mode, the indoor temperature of the room is greater than a set temperature corresponding to the room, and a first temperature difference between the indoor temperature of the room and the set temperature corresponding to the room is greater than a first preset threshold;

the supercooling condition includes that in a cooling mode, the indoor temperature of the room is lower than the set temperature corresponding to the room, and a second temperature difference between the indoor temperature of the room and the set temperature corresponding to the room is greater than a second preset threshold.

In an embodiment, after the operation of acquiring an indoor temperature of each room where an indoor unit in a group corresponding to the multi-split air conditioner is located, the control method further includes:

acquiring a second target room that does not satisfy the overheating condition or the supercooling condition in response to that there exists no room whose indoor temperature satisfies the overheating condition or the supercooling condition, and judging whether an indoor temperature of the second target room reaches a set temperature corresponding to the second target room;
in response to that the indoor temperature of the second target room reaches the set temperature corresponding to the second target room, controlling an indoor unit corresponding to the second target room that reaches the set temperature to be shut down.

In an embodiment, after the operation of switching an operating mode of the target indoor unit, the control method further includes:

determining a third temperature difference between a current indoor temperature of the first target room and a set temperature corresponding to the first target room;
in response to that the third temperature difference is smaller than or equal to a third preset threshold, changing a current operation mode of the target indoor unit and controlling the other indoor units in the group to resume running, where the third preset threshold is smaller than the first preset threshold.

In an embodiment, the operation of determining a third temperature difference between a current indoor temperature of the first target room and a set temperature corresponding to the first target room includes:

in response to that the target indoor unit is in a heating mode, subtracting the set temperature corresponding to the first target room from the current indoor temperature of the first target room to obtain the third temperature difference;
in response to that the target indoor unit is in a cooling mode, subtracting the current indoor temperature of the first target room from the set temperature corresponding to the first target room to obtain the third temperature difference.

In an embodiment, the operation of controlling the other indoor units in the group to resume running includes:

controlling electronic expansion valves corresponding to the other indoor units in the group to be opened and indoor fans corresponding to the other indoor units in the group to resume running.

In an embodiment, after the operation of switching an operating mode of the target indoor unit, the control method further includes:

calculating a fourth temperature difference between a current indoor temperature of each room and an initial temperature corresponding to each room, when the first target room satisfies the supercooling condition or the overheating condition, the indoor temperature of each room in which another indoor unit except the target indoor unit is located is the initial temperature;
in response to that the fourth temperature difference is greater than or equal to a fourth preset threshold, changing a current operation mode of the target indoor unit and controlling the other indoor units in the group to resume running.

In an embodiment, the operation of controlling other indoor units except the target indoor unit in the multi-split air conditioner to be shut down includes:

controlling electronic expansion valves corresponding to the other indoor units except the target indoor unit in the multi-split air conditioner to be closed and the indoor fan to stop running.

In an embodiment, before the operation of acquiring an indoor temperature of each room where an indoor unit in a group corresponding to the multi-split air conditioner is located, the method further includes:

in response to receiving a start instruction of an operation mode, outputting prompt information to prompt whether to start a group control mode;

in response to detecting a determination operation triggered based on the prompt information, outputting a group setting interface of the multi-split air conditioner;

in response to receiving a completion operation triggered based on the group setting interface, controlling each indoor unit in the group to run in the group control mode, where the operation mode is a heating mode or a cooling mode.

In an embodiment, the operation of controlling each indoor unit in the group to run in the group control mode includes:

determining each indoor unit in the group and corresponding operation parameters of each indoor unit according to the completion operation;

controlling each indoor unit in the group to run according to the corresponding operation parameters.

In an embodiment, the operation of acquiring an indoor temperature of each room where an indoor unit in the group corresponding to the multi-split air conditioner is located includes:

acquiring, by a server through polling, the indoor temperature of each room where an indoor unit in the group corresponding to the multi-split air conditioner is located.

In order to realize the above purpose, the present application further provides a control device for a multi-split air conditioner, where the control device of the multi-split air conditioner includes:

an acquisition module configured to acquire an indoor temperature of each room where an indoor unit in a group corresponding to the multi-split air conditioner is located;

the acquisition module being further configured to acquire a target indoor unit corresponding to a first target room satisfying an overheating condition or a supercooling condition in response to that there exists a room whose indoor temperature satisfies the overheating condition or the supercooling condition;

a control module configured to control other indoor units except the target indoor unit in the multi-split air conditioner to be shut down;

a switching module configured to switch an operation mode of the target indoor unit.

To achieve the above purpose, the present application further provides a control terminal, the control terminal includes a processor, a memory and a control program for a multi-split air conditioner stored in the memory and operable by the processor, when the control program is executed by the processor, the following operations are realized:

acquiring an indoor temperature of each room where an indoor unit in a group corresponding to the multi-split air conditioner is located;

acquiring a target indoor unit corresponding to a first target room satisfying an overheating condition or a supercooling condition in response to that there exists a room whose indoor temperature satisfies the overheating condition or the supercooling condition;

controlling other indoor units except the target indoor unit in the multi-split air conditioner to be shut down;

switching an operation mode of the target indoor unit.

To achieve the above purpose, the present application further provides a cloud server, the cloud server includes a processor, a memory, and a control program for a multi-split air conditioner stored in the memory and executable by the processor. when the control program is executed by the processor, the following operations are realized:

acquiring an indoor temperature of each room where an indoor unit in a group corresponding to the multi-split air conditioner is located;

acquiring a target indoor unit corresponding to a first target room satisfying an overheating condition or a supercooling condition in response to that there exists a room whose indoor temperature satisfies the overheating condition or the supercooling condition;

controlling other indoor units except the target indoor unit in the multi-split air conditioner to be shut down;

switching an operation mode of the target indoor unit.

To achieve the above purpose, the present application further provides a storage medium storing a control program for a multi-split air conditioner, the control program, when executed by a processor, realizes the following operations:

acquiring an indoor temperature of each room where an indoor unit in a group corresponding to the multi-split air conditioner is located;

acquiring a target indoor unit corresponding to a first target room satisfying an overheating condition or a supercooling condition in response to that there exists a room whose indoor temperature satisfies the overheating condition or the supercooling condition;

controlling other indoor units except the target indoor unit in the multi-split air conditioner to be shut down;

switching an operation mode of the target indoor unit.

One or more technical solutions provided in the embodiments of the present application have at least the following technical effects or advantages:

1. In response to that the multi-split air conditioner is heating, cooling a target room where a temperature is too high, so that an indoor temperature in the target room is reduced, and in response to that the multi-split air conditioner is cooling, heating a target room where a temperature is too low, so that an indoor temperature in the target room is increased, it solves the problem that the heating or cooling of the multi-split air conditioner threatens health of users in the related art, enables the temperature of a target room to quickly return to an temperature set by the users, and prevents the users from feeling uncomfortable caused by being in an overcooled or overheated environment for a long time.

2. In response to that no room satisfies the overheating condition or the supercooling condition, whether an indoor temperature of each room reaches a corresponding set temperature is judged, and if so, an indoor unit corresponding to a room that reaches the corresponding set temperature is controlled to stop, so as to avoid the phenomenon of supercooling or overheating in the room.

3. In response to that a difference between the indoor temperature of the target room corresponding to the target indoor unit that has switched a mode and the corresponding set temperature is lower than a preset threshold, the target indoor unit is controlled to switch the mode again, and the operation of each indoor unit is restored to avoid excessive temperature change in the target room, so as to ensure that users in the target room are in a more comfortable environment.

4. In response to that a temperature variation of each other room where another indoor unit is located is greater than a corresponding set variation, the mode of the target indoor unit is controlled to switch again, and the operation of each indoor unit is resumed, so as to avoid excessive temperature changes in other rooms and ensure that the overheating elimination or the supercooling elimination of the target indoor unit will not affect the heating experience or cooling experience of users corresponding to the other rooms.

5. The users set each indoor unit in the group on a group setting interface to prevent the users from setting the parameters of the indoor units to be operated one by one. The user's control operation on the multi-split air conditioner is simple and convenient.

The realization of the purposes, functional features and advantages of the present application will be further explained with reference to the accompanying drawings in connection with the embodiments.

DETAILED DESCRIPTION OF THE EMBODIMENTS

It should be understood that the specific embodiments described herein are for illustration purposes only and are not set to limit the present application.

A main solution of the embodiments of the present application is as follows: acquiring an indoor temperature of each room where an indoor unit in a group corresponding to a multi-split air conditioner is located; acquiring a target indoor unit corresponding to a first target room satisfying an overheating condition or a supercooling condition in response to that there exists a room whose indoor temperature room satisfies the overheating condition or the supercooling condition; controlling other indoor units except the target indoor unit in the multi-split air conditioner to be shut down; switching an operation mode of the target indoor unit.

In response to that the phenomenon of supercooling or overheating occurs in a room, a mode of an indoor unit in the room is controlled to be changed, so that a temperature of the room can quickly return to a comfortable temperature, and the occurrence of discomfort in a supercooling or overheating environment for a long time is avoided.

Figure 1:
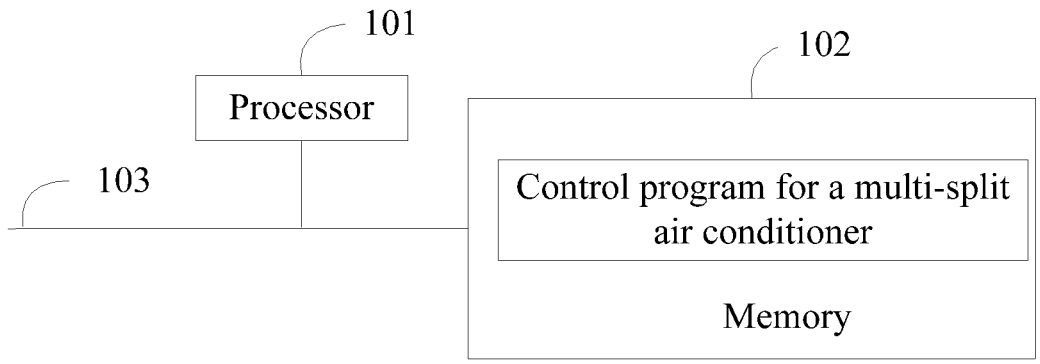
FIG. 1 is a schematic diagram of a hardware structure of a household appliance according to an embodiment of the present application.

As one implementation scheme, a multi-split air conditioner can be shown in FIG. 1.

An embodiment of the present application relates to a multi-split air conditioner, which includes a processor 101, such as a CPU, a memory 102, and a communication bus 103. The communication bus 103 is provided to realize connection and communication between those components.

The memory 102 may be a high-speed RAM memory or a non-volatile memory, such as a magnetic disk memory. As shown in FIG. 1, the memory 103, which is a computer storage medium, can include a control program for a multi-split air conditioner. The processor 101 can be configured to invoke the control program for a multi-split air conditioner stored in the memory 102 and perform the following operations:

acquiring an indoor temperature of each room where an indoor unit in a group corresponding to a multi-split air conditioner is located;

acquiring a target indoor unit corresponding to a first target room satisfying an overheating condition or a supercooling condition in response to that there exists a room whose indoor temperature satisfies the overheating condition or the supercooling condition;

controlling other indoor units except the target indoor unit in the multi-split air conditioner to be shut down;

switching an operation mode of the target indoor unit.

In one embodiment, the processor 101 can be configured to invoke the control program for a multi-split air conditioner stored in the memory 102 and perform the following operations:

the overheating condition including that in a heating mode, the indoor temperature of the room is greater than a set temperature corresponding to the room, and a first temperature difference between the indoor temperature of the room and the set temperature corresponding to the room is greater than a first preset threshold;

the supercooling condition including that in a cooling mode, the indoor temperature of the room is lower than the set temperature corresponding to the room, and a second temperature difference between the indoor temperature of the room and the set temperature corresponding to the room is greater than a second preset threshold.

In one embodiment, the processor 101 can be configured to invoke the control program for a multi-split air conditioner stored in the memory 102 and perform the following operations:

acquiring a second target room that does not satisfy the overheating condition or the supercooling condition in response to that there is no room whose indoor temperature satisfies the overheating condition or the supercooling condition, and judging whether the indoor temperature of the second target room reaches a set temperature corresponding to the second target room;

in response to that the indoor temperature of the second target room reaches the set temperature corresponding to the second target room, controlling an indoor unit corresponding to the second target room that reaches the set temperature to be shut down.

In one embodiment, the processor 101 can be configured to invoke the control program for a multi-split air conditioner stored in the memory 102 and perform the following operations:

determining a third temperature difference between a current room temperature of the first target room and a set temperature corresponding to the first target room;

in response to that the third temperature difference is smaller than or equal to a third preset threshold, switching a current operation mode of the target indoor unit and controlling the other indoor units in the group to resume running, where the third preset threshold is smaller than the first preset threshold.

In one embodiment, the processor 101 can be configured to invoke the control program for a multi-split air conditioner stored in the memory 102 and perform the following operations:

in response to that the first target room satisfies the supercooling condition or the overheating condition, calculating a fourth temperature difference between a current indoor temperature of each room and an initial temperature corresponding to each room, the indoor temperature of each room where an indoor unit other than the target indoor unit is located is the initial temperature;

in response to that the fourth temperature difference is greater than or equal to a fourth preset threshold, switching the current operation mode of the target indoor unit and controlling each other indoor unit in the group to resume running.

In one embodiment, the processor 101 can be configured to invoke a control program for a multi-split air conditioner stored in the memory 102 and perform the following operations:

controlling electronic expansion valves corresponding to other indoor units except the target indoor unit in the multi-split air conditioner to be closed and indoor fans corresponding to the other indoor units except the target indoor unit in the multi-split air conditioner to stop running.

In one embodiment, the processor 101 can be configured to invoke the control program for a multi-split air conditioner stored in the memory 102 and perform the following operations:

in response to receiving a start instruction of an operation mode, outputting prompt information to prompt whether to start a group control mode;

in response to detecting a determination operation triggered based on the prompt information, outputting a group setting interface of the multi-split air conditioner;

in response to receiving a completion operation triggered based on the group setting interface, controlling each indoor unit in the group to run in the group control mode, where the operation mode is the heating mode or the cooling mode.

According to the above scheme of this embodiment, a target room where a temperature is too high is cooled during heating of the multi-split air conditioner, so that an indoor temperature of the target room is reduced, a target room where a temperature is too low is heated during cooling of the multi-split air conditioner, so that an indoor temperature of the target room is increased, which solves the problem in the related art that the heating or cooling of the multi-split air conditioner threatens the health of users, and enables the indoor temperature of the target room to quickly return to a temperature set by the user, preventing the user from feeling uncomfortable caused by being in an overcooled or overheated environment for a long time.

Based on the hardware architecture of the household appliances and the control terminal, embodiments of a control method for a multi-split air conditioner of the present application are proposed.

Figure 2:
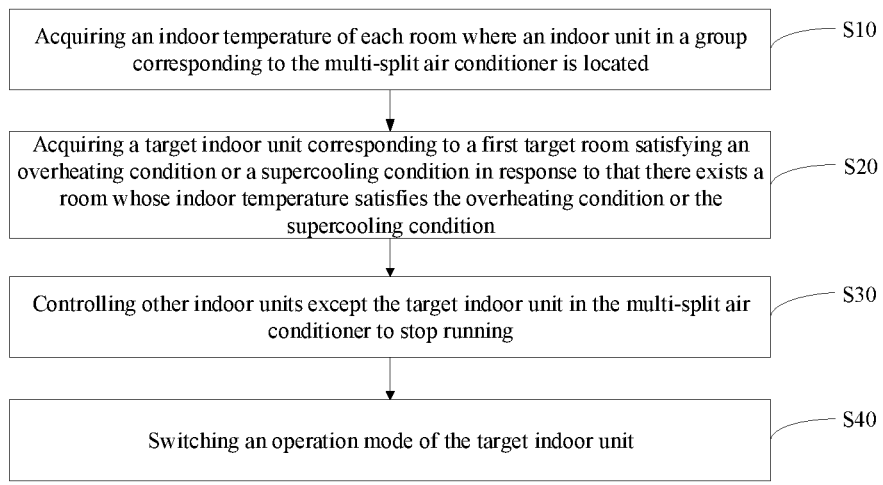
FIG. 2 is a schematic flow diagram of a first embodiment of a control method for a multi-split air conditioner of the present application.

Referring to FIG. 2, FIG. 2 is a first embodiment of the control method for the multi-split air conditioner of the present application. The control method for the multi-split air conditioner includes the following operations:

operation S10, acquiring an indoor temperature of each room where an indoor unit in a group corresponding to the multi-split air conditioner is located;

In the present application, an execution subject is a cloud server or a control terminal, the control terminal is loaded with an APP associated with the cloud server, and the cloud server is a control server of the multi-split air conditioner. For convenience of description, the cloud server is taken as the execution subject to describe the scheme in detail.

The multi-split air conditioner includes an outdoor unit and a plurality of indoor units, each indoor unit is provided with a communication module, and the communication module can be a WIFI module. Each indoor unit is connected to a home router through the WIFI module, so that the multi-split air conditioner establishes a connection with the cloud server and communicates with the cloud server.

In response to that a user turns on the multi-split air conditioner for heating or cooling, i.e., the user sends a start instruction of an operation mode to the multi-split air conditioner, and the multi-split air conditioner sends the start instruction of the operation mode to the cloud server. When the cloud server receives the start instruction, it will feed back prompt information of whether to start a group control mode to the multi-split air conditioner, so that the multi-split air conditioner will display the prompt information. The group control mode means that the user controls a plurality of indoor units at the same time. If the user needs to turn on the group control mode, a determination instruction is sent to the multi-split air conditioner, at this time, the multi-split air conditioner sends the determination instruction to the cloud server, so that the cloud server feeds back a group setting interface, and so that the user can add indoor units to be controlled in the group setting interface, and set parameters for each indoor unit. The parameters for each indoor unit can be a set temperature, a set humidity, a set wind speed, and etc. In response to that the user clicks the group setting interface to trigger a completion operation, that is, in response to that the user clicks to complete the setting, the cloud server determines each indoor unit in the group and the set parameters of each indoor unit according to the group setting interface, thereby controlling each indoor unit in the group to operate in the operation mode according to the corresponding set parameters, and the operation mode is a heating mode or a cooling mode. Therefore, the user can control multiple indoor units to run according to corresponding parameters at one time through the group setting interface, and the user can operate the multi-split air conditioner simply.

All of the above are based on the user causing the cloud server to control the operation of each indoor unit in the group through the multi-split air conditioner. The user can also cause the cloud server to control the operation of each indoor unit through a terminal loaded with a control program for a multi-split air conditioner.

Serving as a control terminal of each indoor unit in the group, the cloud server will not detect the temperature of each room where an indoor unit is located in real time because of a large number of tasks the cloud server handles, but will only detect the temperature of each room where an indoor unit is located through polling. In this way, the temperature of each room will greatly exceed the set temperature, resulting in supercooling or overheating.

In this regard, the cloud server obtains the indoor temperature of each room where an indoor unit in the group is located during polling.

Operation S20, acquiring a target indoor unit corresponding to a first target room satisfying an overheating condition or a supercooling condition in response to that there exists a room whose indoor temperature satisfies the overheating condition or the supercooling condition;

in the present application, the overheating condition refers to that: an indoor unit is in the heating mode, an indoor temperature of a room where the indoor unit is located reaches the set temperature, and a first temperature difference between the indoor temperature and the set temperature is greater than a first preset threshold (the first preset threshold can be any suitable value, such as 4° C.).

The supercooling condition means that: the indoor unit is in the cooling mode, the indoor temperature of the room where the indoor unit is located reaches the set temperature, and a second temperature difference between the set temperature and the indoor temperature is greater than a second preset threshold (the second preset threshold can be any suitable value, such as 5° C.).

In response to that an indoor temperature of a room satisfies the supercooling condition or the overheating condition, the room is taken as a target room, namely the first target room, an indoor unit corresponding to the first target room is determined, and the indoor unit is the target indoor unit.

Operation S30, controlling other indoor units except the target indoor unit in the multi-split air conditioner to stop running;

operation S40, switching an operation mode of the target indoor unit.

An outdoor unit of the multi-split air conditioner can only be in one mode, that is, the outdoor unit can only operate either in the heating mode or in the cooling mode. However, when the first target room is overheated, the first target room needs to be cooled down at this time. Because the indoor unit cannot operate in the heating mode and the cooling mode at the same time, and rooms where other indoor units are located do not have an overheating phenomenon, that is, the other rooms do not need to be cooled down. Therefore, the other indoor units except the target indoor unit are shut down, and an operation mode of the indoor unit is changed, i.e., the indoor unit is switched from the heating mode to the cooling mode, so that the indoor temperature of the first target room is rapidly reduced, the user is prevented from being in an overheated environment for a long time, and the occurrence of discomfort of the user is prevented. It should be noted that, the shutdown of other indoor units refers to closing electronic expansion valves corresponding to the other indoor units and shutting down indoor fans corresponding to the other indoor units. The operation mode of the other indoor units is not changed, but still the heating mode. Similarly, in response to that supercooling occurs in the first target room, all other indoor units except the target indoor unit are controlled to stop running, and the target indoor unit is switched from the cooling mode to the heating mode.

In the technical scheme provided in this embodiment, when heating with the multi-split air conditioner, a target room where a temperature is too high is cooled, so that an indoor temperature in the target room is reduced. when cooling with the multi-split air conditioner, a target room where a temperature is too low is heated, so that the indoor temperature in the target room is increased, which solves the problem in the related art that the cooling or heating of the multi-split air conditioner threatens health of the user, and enables the temperature of the target room to quickly return to the temperature set by the user, preventing the user from feeling uncomfortable caused by being in an overcooled or overheated environment for a long time.

Figure 3:
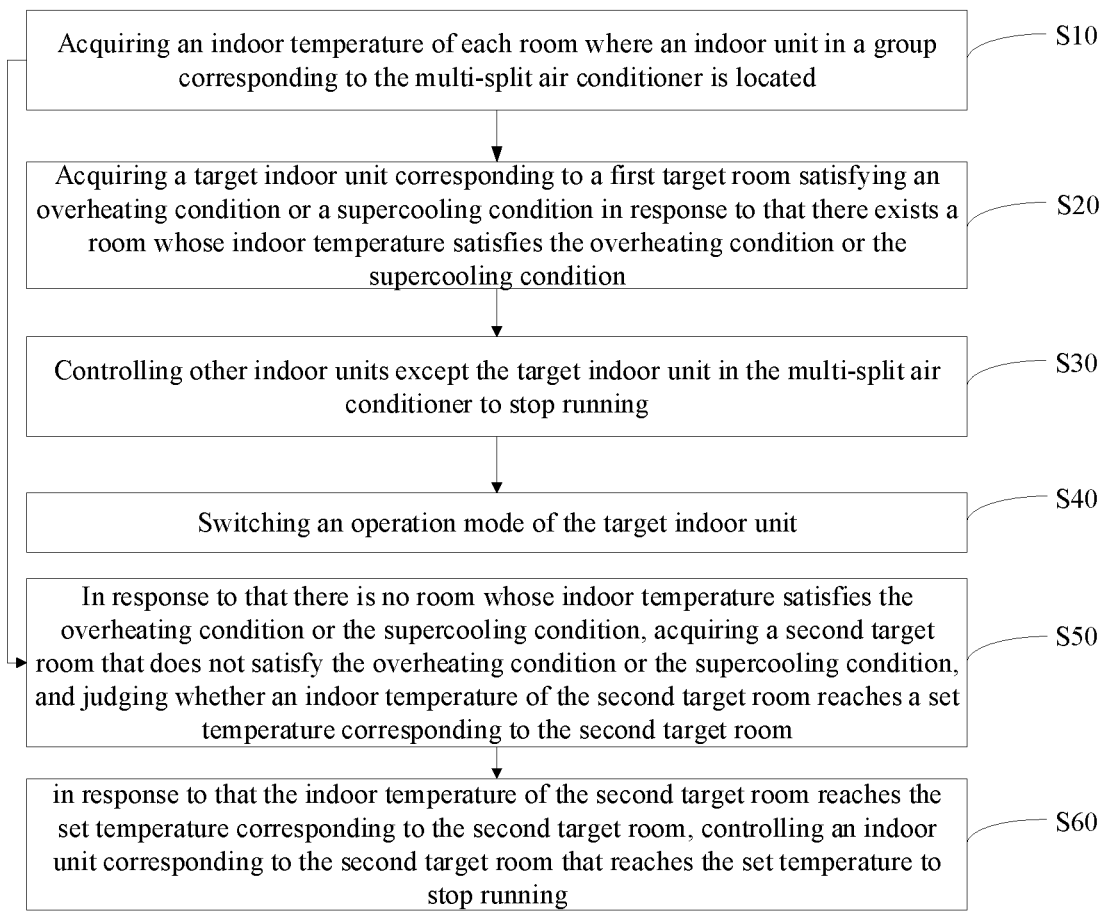
FIG. 3 is a schematic flow diagram of a second embodiment of the control method for the multi-split air conditioner of the present application.

Referring to FIG. 3, FIG. 3 is a second embodiment of the control method for the multi-split air conditioner according to the present application. Based on the first embodiment, after operation S10, the control method further includes:

operation S50, in response to that there is no room whose indoor temperature satisfies the overheating condition or the supercooling condition, acquiring a second target room that does not satisfy the overheating condition or the supercooling condition, and judging whether an indoor temperature of the second target room reaches a set temperature corresponding to the second target room;

operation S60, in response to that the indoor temperature of the second target room reaches the set temperature corresponding to the second target room, controlling an indoor unit corresponding to the second target room that reaches the set temperature to stop running;

in this embodiment, when no room satisfies the supercooling or overheating condition, and each indoor unit is in normal operation, indoor temperatures of some rooms may have reached the set temperature. If indoor units that have reached the set temperature are not controlled this time, the rooms where these indoor units are located will be supercooled or overheated before the next polling by the cloud server. In this regard, in response to that no room satisfies the supercooling condition or the overheating condition, the cloud server takes each room as a second target room, and judge whether the temperature of each second target room reaches the set temperature. If the temperatures of some second target rooms reach the set temperature, controlling the indoor units corresponding to those rooms to stop running (i.e., controlling electronic expansion valve corresponding to the indoor units to be closed and the indoor unit fans corresponding to the indoor units to stop running), thereby avoiding the phenomenon of overheating or supercooling in those second target rooms.

In the technical scheme provided in this embodiment, in response to that no room satisfies the overheating condition or the supercooling condition, it is judged whether an indoor temperature of each room reaches a corresponding set temperature, if so, the indoor unit corresponding to the room that reaches the set temperature is controlled to stop running, thereby avoiding the phenomenon of supercooling or overheating in the room.

Figure 4:
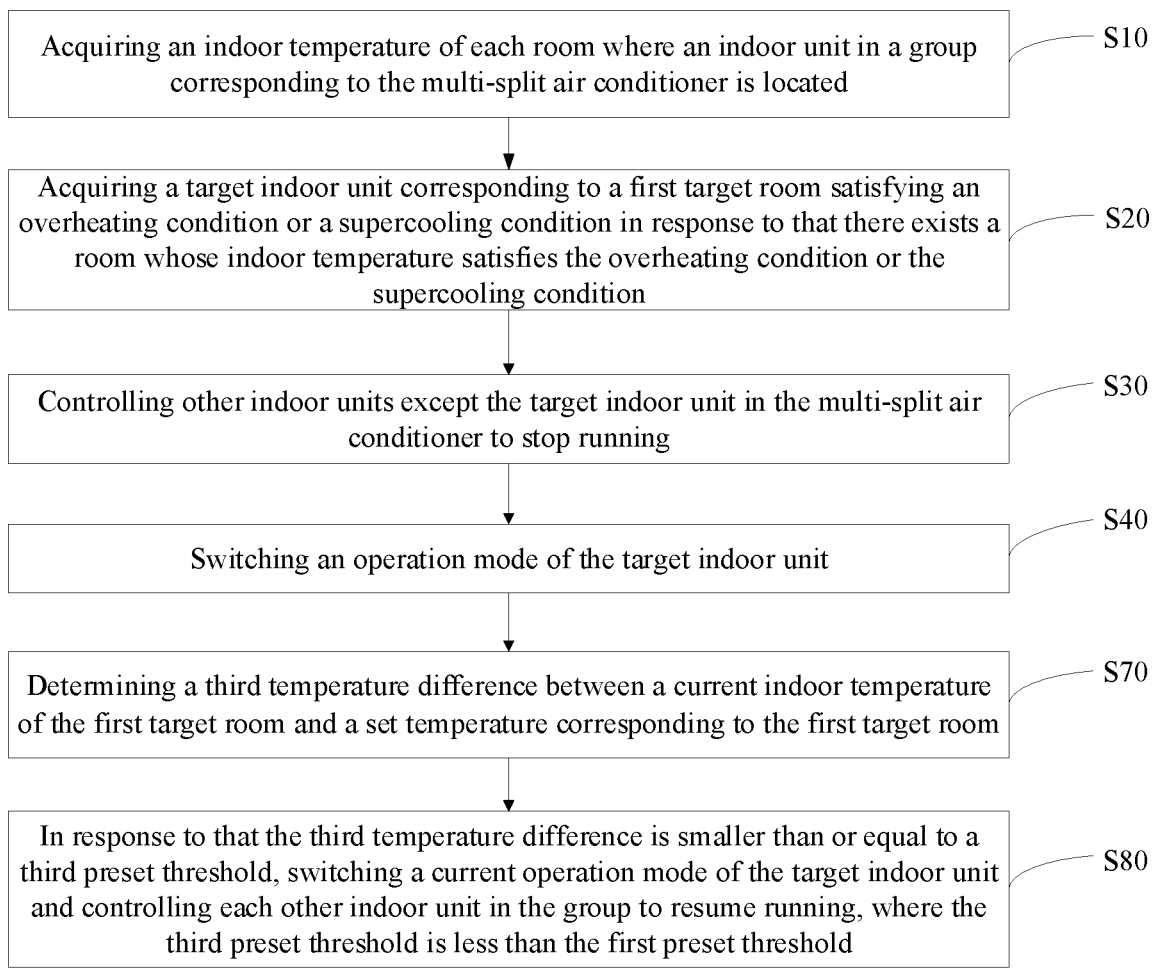
FIG. 4 is a schematic flow diagram of a third embodiment of the control method for the multi-split air conditioner of the present application.

Referring to FIG. 4, FIG. 4 is a third embodiment of the control method for the multi-split air conditioner according to the present application. Based on the first or second embodiment, after operation S30, the control method further includes:

operation S70, determining a third temperature difference between a current indoor temperature of the first target room and a set temperature corresponding to the first target room;

operation S80, in response to that the third temperature difference is smaller than or equal to a third preset threshold, switching a current operation mode of the target indoor unit and controlling each other indoor unit in the group to resume running, where the third preset threshold is smaller than the first preset threshold.

After the target indoor unit changes the mode, the indoor temperature of the first target room quickly approaches the set temperature. For example, the first target room is overheated, after the indoor unit switches the mode, the indoor temperature of the room drops rapidly. When the third temperature difference between the indoor temperature and the set temperature is small, the overheating of the first target room has been eliminated. In order to ensure that the user stays at the desired ambient temperature, the target indoor unit should stop cooling and start heating. Based on this, the multi-split air conditioner sets the third preset threshold. Under the heating condition and when the indoor unit eliminates the overheating phenomenon, if the third temperature difference is smaller than or equal to the third preset threshold (the third temperature difference is obtained by subtracting the set temperature from the current indoor temperature of the first target room and is positive), at this time, the indoor unit needs to be switched again to control the indoor unit to operate in the heating mode. Under the cooling condition and when the indoor unit eliminates the supercooling phenomenon, if the third temperature difference is smaller than or equal to the third preset threshold (the third temperature difference is obtained by subtracting the current indoor temperature from the set temperature of the first target room and is positive), at this time, the indoor unit needs to be switched again to control the indoor unit to operate in the cooling mode. in response to that the mode of the target indoor unit is changed again, the electronic expansion valve of each other indoor unit that has been turned off is opened, and the indoor fan corresponding to each other indoor unit is controlled to run at the same time, so that each other indoor unit resume running.

In the technical scheme provided in this embodiment, in response to that a difference between an indoor temperature of a target room corresponding to a target indoor unit which has been changed a mode and a set temperature of the target room is lower than a preset threshold, the target indoor unit is controlled to change the mode again, and each indoor unit is resumed running to avoid excessive temperature change in the target room, so as to ensure that the user in the target room stays in a more comfortable environment.

Figure 5:
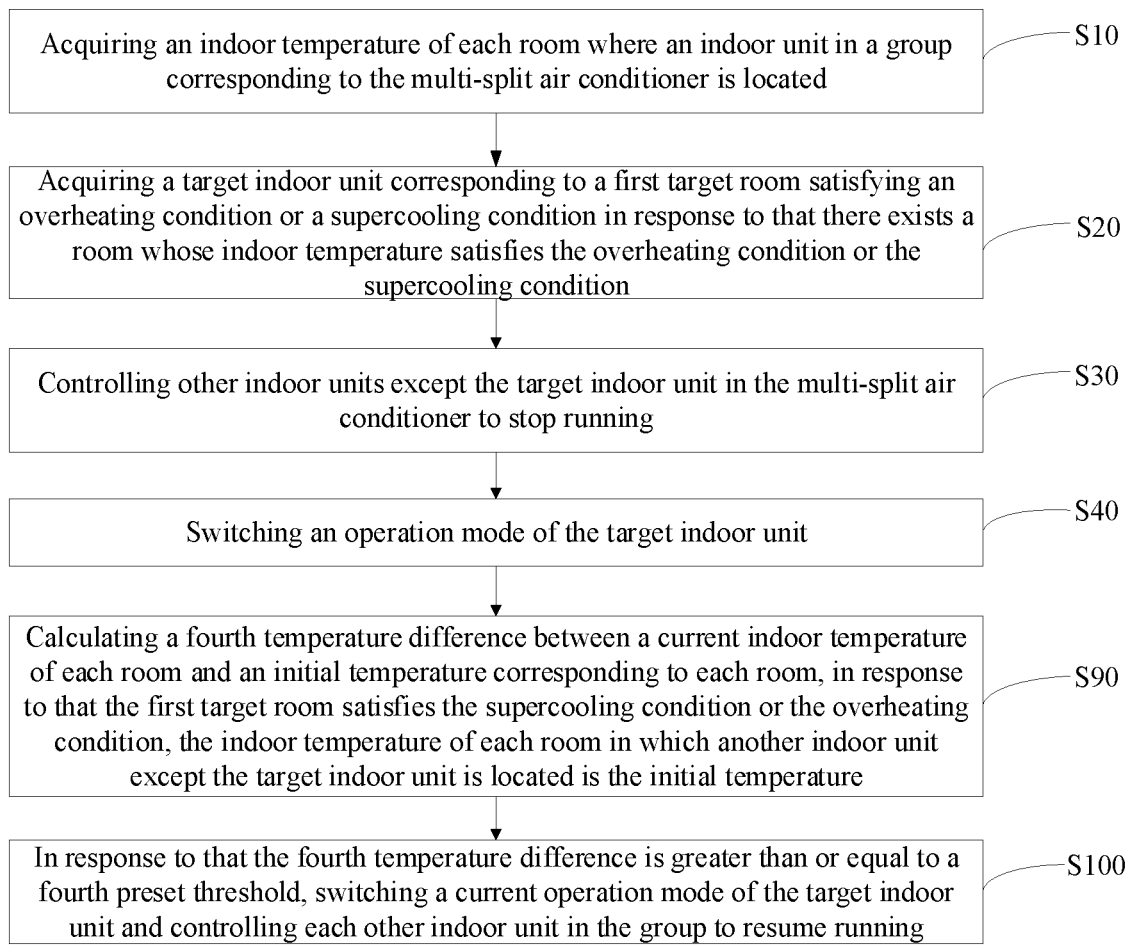
FIG. 5 is a schematic flow diagram of a fourth embodiment of the control method for the multi-split air conditioner of the present application.

Referring to FIG. 5, FIG. 5 is a fourth embodiment of the control method for a multi-split air conditioner according to the present application. Based on any one of the first to third embodiments, after operation S30, the method further includes:

operation S90, calculating a fourth temperature difference between a current indoor temperature of each room and an initial temperature corresponding to each room, in response to that the first target room satisfies the supercooling condition or the overheating condition, the indoor temperature of each room in which another indoor unit except the target indoor unit is located is the initial temperature;

operation S100, in response to that the fourth temperature difference is greater than or equal to a fourth preset threshold, switching a current operation mode of the target indoor unit and controlling each other indoor unit in the group to resume running;

after the mode of the indoor unit corresponding to the first target room is changed, each other indoor unit is in a shutdown state. That is, an indoor temperature of each room where another indoor unit is located gradually decreases (each other indoor unit is in the heating mode, and the indoor temperature gradually decreases) or gradually increases (each other indoor unit is in the cooling mode, and the indoor temperature gradually increases). If the change of the indoor temperature is large, the user in the rooms where the other indoor units are located will inevitably feel hotter (the other indoor units are in the cooling mode) or colder (the other indoor units are in the heating mode).

In order to ensure that the users of the other rooms stay in a relative comfortable environment, the multi-split air conditioner is set with a fourth preset threshold. In the case of heating and an indoor unit eliminating the overheating phenomenon, if the fourth temperature difference obtained by subtracting a current temperature of each room where another indoor unit is located from an initial temperature of the room is greater than or equal to a fourth preset threshold, it indicates that the overheating elimination of the target indoor unit affects the feelings of users corresponding to the other indoor units. At this time, it is needed to resume the running of each other indoor unit and control the target indoor unit to change the mode again.

Similarly, in the case of cooling and an indoor unit eliminating the supercooling phenomenon, if the fourth temperature difference obtained by subtracting an initial temperature of each room where another indoor unit is located from the current indoor temperature of the room is greater than or equal to the fourth preset threshold, it indicates that the supercooling elimination of the target indoor unit affects the feelings of users corresponding to the other indoor units. At this time, it is needed to resume the running of each other indoor unit and control the target indoor unit to change the mode again. It should be noted that the initial temperature refers to an indoor temperature of each room where another indoor unit is located in response to that the target indoor unit performs overheating elimination or supercooling elimination.

In the technical scheme provided in this embodiment, in response to that a change amount of temperature of the rooms where the other indoor units are located is greater than a set change amount, the target indoor unit is controlled to change the mode again, and each indoor unit is resumed running, so as to avoid excessive temperature changes in other rooms and ensure that the overheating elimination or supercooling elimination of the target indoor unit will not affect the heating experience or cooling experience of the users in the other rooms.

The present application also provides a control device for a multi-split air conditioner, the control device for the multi-split air conditioner includes:

an acquisition module, configured to acquire an indoor temperature of each room where an indoor unit in a group corresponding to the multi-split air conditioner is located;

the acquisition module being further configured to acquire a target indoor unit corresponding to a first target room satisfying an overheating condition or a supercooling condition in response to that there exists a room whose indoor temperature satisfies the overheating condition or the supercooling condition;

a control module configured to control other indoor units except the target indoor unit in the multi-split air conditioner to be shut down;

a switching module configured to switch an operation mode of the target indoor unit.

Further, the acquisition module is further configured to acquire a second target room that does not satisfy the overheating condition or the supercooling condition in response to that there is no room whose indoor temperature satisfies the overheating condition or the supercooling condition, and judge whether an indoor temperature of the second target room reaches a set temperature corresponding to the second target room;

the control module is further configured to control an indoor unit corresponding to the second target room which reaches the set temperature to be shut down in response to that the indoor temperature of the second target room reaches the set temperature corresponding to the second target room.

Further, the control device for the multi-split air conditioner also includes:

a determination module configured to determine a third temperature difference between a current indoor temperature of the first target room and a set temperature corresponding to the first target room;

the switching module is further configured to switch a current operation mode of the target indoor unit and control each other indoor unit in the group to resume running in response to that the third temperature difference is smaller than or equal to a third preset threshold, the third preset threshold being smaller than the first preset threshold.

Further, the control device for the multi-split air conditioner also includes:

a calculation module configured to calculate a fourth temperature difference between a current indoor temperature of each room and an initial temperature corresponding to the room, in response to that the first target room satisfies the supercooling or overheating condition, the indoor temperature of each room in which each other indoor unit except the target indoor unit is located is the initial temperature;

the switching module is further configured to switch a current operation mode of the target indoor unit in response to that the fourth temperature difference is greater than or equal to a fourth preset threshold, and control each other indoor unit in the group to resume running.

Furthermore, the control module is further configured to control electronic expansion valves corresponding to other indoor units except the target indoor unit in the multi-split air conditioner to be closed and indoor fans corresponding to the other indoor units to stop running.

Further, the control device for a multi-split air conditioner also includes:

an output module configured to output prompt information to prompt whether to start a group control mode in response to receiving a start instruction of an operation mode;

the output module is further configured to output a group setting interface of the multi-split air conditioner in response to detecting a determination operation triggered based on the prompt information;

the control module is further configured to control each indoor unit in the group to operate in the group control mode in response to receiving a completion operation triggered based on the group setting interface, the operation mode is a heating mode or a cooling mode.

The present application also provides a control terminal, the control terminal includes a processor, a memory, and control program for a multi-split air conditioner stored in the memory and executable on the processor. In response to that the control program for a multi-split air conditioner is executed by the processor, each operation of the control method for a multi-split air conditioner described in the above embodiments is realized.

The present application also provides a cloud server, the cloud server includes a processor, a memory, and a control program for a multi-split air conditioner stored in the memory and executable on the processor. In response to that the control program for a multi-split air conditioner is executed by the processor, each operation of the control method for a multi-split air conditioner described in the above embodiments is realized.

The present application also provides a storage medium storing a control program for a multi-split air conditioner, in response to that the control program for a multi-split air conditioner is executed by a processor, each operation of the control method for a multi-split air conditioner as described in the above embodiments is realized.

The above-mentioned numbering of the embodiments of the present application is for description only and does not represent the advantages and disadvantages of the embodiments.

It should be noted that, in this article, the terms "comprise," "include" or any other variant thereof are intended to encompass non-exclusive inclusion such that a process, method, article, or apparatus that includes a series of elements includes not only those elements, but also other elements not explicitly listed, or elements inherent to such process, method, article, or apparatus. Without further limitation, an element defined by a statement "includes a . . . " does not exclude the existence of another identical element in the process, method, article or device including the element.

From the above description of embodiments, it will be apparent to those skilled in the art that the method of the above embodiments can be implemented by means of software plus a needed general hardware platform, of course can also be implemented by means of hardware, but in many cases the former is better. Based on this understanding, the technical solutions of the present application can be embodied in the form of software products in essence or parts that contribute to the related art. The computer software product is stored in a storage medium (such as a ROM/RAM, a magnetic disk, an optical disk) as described above, and includes several instructions to cause a terminal device (which may be a mobile phone, a computer, a server, an air conditioner, a network device, etc.) to perform the methods described in various embodiments of the present application.

The above are only optional embodiments of the present application, and are not intended to limit the scope of the present application. Any equivalent structure or equivalent process transformation made by using the contents of the specification and drawings of the present application, or direct or indirect application in other related technical fields, is included in the claimed scope of the present application.

What is claimed is:

1. A control method comprising:
   acquiring indoor temperatures of a plurality of rooms each having one of a plurality of indoor units of a multi-split air conditioner;

identifying a target indoor unit corresponding to a target room in response to the target room satisfying an overheating condition or a supercooling condition;

controlling other one or more indoor units of the multi-split air conditioner except for the target indoor unit to be shut down; and controlling the target indoor unit to switch an operation mode of the target indoor unit between a heating operation mode and a cooling operation mode, including:

in response to the target room satisfying the overheating condition, switching the operation mode of the target indoor unit from the heating operation mode to the cooling operation mode; and in response to the target room satisfying the supercooling condition, switching the operation mode of the target indoor unit from the cooling operation mode to the heating operation mode.

2. The control method of claim 1, wherein:

the target room satisfying the overheating condition includes that:

the target room is in a heating mode, the indoor temperature of the target room is greater than a set temperature corresponding to the target room, and a first temperature difference between the indoor temperature of the target room and the set temperature is greater than a first preset threshold; and the target room satisfying the supercooling condition includes that:

the target room is in a cooling mode, the indoor temperature of the target room is lower than the set temperature, and a second temperature difference between the indoor temperature of the target room and the set temperature is greater than a second preset threshold.

3. The control method of claim 2, further comprising, after controlling the target indoor unit to switch the operating mode of the target indoor unit:

determining a third temperature difference between a current indoor temperature of the target room and the set temperature; and in response to that the third temperature difference is smaller than or equal to a third preset threshold that is smaller than the first preset threshold:

controlling the target indoor unit to switch the operation mode of the target indoor unit again; and controlling the other one or more indoor units to resume running.

4. The control method of claim 3, wherein determining the third temperature difference includes:

in response to that the target indoor unit is in a heating mode, subtracting the set temperature from the current indoor temperature of the target room to obtain the third temperature difference; or in response to that the target indoor unit is in a cooling mode, subtracting the current indoor temperature of the target room from the set temperature to obtain the third temperature difference.

5. The control method of claim 3, wherein controlling the other one or more indoor units to resume running includes:

controlling an electronic expansion valve corresponding to each of the other one or more indoor units to be opened and an indoor fan corresponding to each of the other one or more indoor units to resume running.

6. The control method of claim 1, wherein the target room is a first target room and the target indoor unit is a first target indoor unit;

the method further comprising, after acquiring the indoor temperatures:

in response to none of the rooms satisfying the overheating condition or the supercooling condition:

identifying a second target room from the plurality of rooms; and judging whether the indoor temperature of the second target room reaches a set temperature corresponding to the second target room; and in response to that the indoor temperature of the second target room reaches the set temperature, controlling a second target indoor unit corresponding to the second target room to be shut down.

7. The control method of claim 1, further comprising, after controlling the target indoor unit to switch the operating mode of the target indoor unit:

for a room other than the target room, calculating a temperature difference between a current indoor temperature of the room and an initial temperature corresponding to the room, the initial temperature being the indoor temperature of the room at the time when the target room satisfies the supercooling condition or the overheating condition; and in response to the temperature difference being greater than or equal to a preset threshold:

controlling the target indoor unit to switch the operation mode of the target indoor unit; and controlling the other one or more indoor units to resume running.

8. The control method of claim 1, wherein controlling the other one or more indoor units to be shut down includes:

controlling an electronic expansion valve corresponding to each of the other one or more indoor units to be stopped and an indoor fan corresponding to each of the other one or more indoor units to stop running.

9. The control method of claim 1, further comprising, before acquiring the indoor temperatures:

in response to receiving a start instruction for starting a heating mode or a cooling mode, outputting prompt information whether to start a group control mode;

in response to detecting a determination operation triggered based on the prompt information, outputting a group setting interface of the multi-split air conditioner; and in response to receiving a completion operation triggered based on the group setting interface, controlling the indoor units to run in the group control mode.

10. The control method of claim 9, wherein controlling the indoor units to run in the group control mode includes:

determining, according to the completion operation, one or more indoor units of the indoor units to be in a group and a corresponding operation parameter of each of the one or more indoor units; and controlling each of the one or more indoor units in the group to run according to the corresponding operation parameter.

11. The control method of claim 1, wherein acquiring the indoor temperatures includes:

acquiring, by a server through polling, the indoor temperatures.

12. A storage medium storing a control program that, when executed by a processor, causes the processor to perform the method of claim 1.

13. A control terminal comprising:
a processor; and
a memory storing a control program that, when executed by the processor, causes the processor to:
  acquire indoor temperatures of a plurality of rooms each having one of a plurality of indoor units of a multi-split air conditioner;
  identify a target indoor unit corresponding to a target room in response to the target room satisfying an overheating condition or a supercooling condition;
  control other one or more indoor units of the multi-split air conditioner except for the target indoor unit to be shut down; and
  control the target indoor unit to switch an operation mode of the target indoor unit between a heating operation mode and a cooling operation mode, including:
    in response to the target room satisfying the overheating condition, switching the operation mode of the target indoor unit from the heating operation mode to the cooling operation mode; and
    in response to the target room satisfying the supercooling condition, switching the operation mode of the target indoor unit from the cooling operation mode to the heating operation mode.

14. The control terminal of claim 13, wherein:
the target room satisfying the overheating condition includes that:
  the target room is in a heating mode,
  the indoor temperature of the target room is greater than a set temperature corresponding to the target room, and
  a first temperature difference between the indoor temperature of the target room and the set temperature is greater than a first preset threshold; and
the target room satisfying the supercooling condition includes that:
  the target room is in a cooling mode,
  the indoor temperature of the target room is lower than the set temperature, and
  a second temperature difference between the indoor temperature of the target room and the set temperature is greater than a second preset threshold.

15. The control terminal of claim 13, wherein:
the target room is a first target room and the target indoor unit is a first target indoor unit;
the control program further causes the processor to, after acquiring the indoor temperatures:
  in response to none of the rooms satisfying the overheating condition or the supercooling condition:
    identify a second target room from the plurality of rooms; and
    judge whether the indoor temperature of the second target room reaches a set temperature corresponding to the second target room; and
  in response to that the indoor temperature of the second target room reaches the set temperature, control a second target indoor unit corresponding to the second target room to be shut down.

16. The control terminal of claim 13, wherein the control program further causes the processor to, after the target indoor unit is controlled to switch the operating mode of the target indoor unit:
  for a room other than the target room, calculate a temperature difference between a current indoor temperature of the room and an initial temperature corresponding to the room, the initial temperature being the indoor temperature of the room at the time when the target room satisfies the supercooling condition or the overheating condition; and
  in response to the temperature difference being greater than or equal to a preset threshold:
    control the target indoor unit to switch the operation mode of the target indoor unit; and
    control the other one or more indoor units to resume running.

17. The control terminal of claim 13, wherein the control program further causes the processor to:
  control an electronic expansion valve corresponding to each of the other one or more indoor units to be stopped and an indoor fan corresponding to each of the other one or more indoor units to stop running.

18. The control terminal of claim 13, wherein the control program further causes the processor to, before acquiring the indoor temperatures:
  in response to receiving a start instruction for starting a heating mode or a cooling mode, output prompt information whether to start a group control mode;
  in response to detecting a determination operation triggered based on the prompt information, output a group setting interface of the multi-split air conditioner; and
  in response to receiving a completion operation triggered based on the group setting interface, control the indoor units to run in the group control mode.

19. The control terminal of claim 13, wherein the indoor temperatures are received from a server and acquired by the server through polling.

20. A cloud server comprising:
a processor; and
a memory storing a control program that, when executed by the processor, causes the processor to:
  acquire indoor temperatures of a plurality of rooms each having one of a plurality of indoor units of a multi-split air conditioner;
  identify a target indoor unit corresponding to a target room in response to the target room satisfying an overheating condition or a supercooling condition;
  control other one or more indoor units of the multi-split air conditioner except for the target indoor unit to be shut down; and
  control the target indoor unit to switch an operation mode of the target indoor unit between a heating operation mode and a cooling operation mode, including:
    in response to the target room satisfying the overheating condition, switching the operation mode of the target indoor unit from the heating operation mode to the cooling operation mode; and
    in response to the target room satisfying the supercooling condition, switching the operation mode of the target indoor unit from the cooling operation mode to the heating operation mode.

* * * * *